United States Patent
Busch et al.

(10) Patent No.: US 12,165,632 B2
(45) Date of Patent: *Dec. 10, 2024

(54) ALWAYS-ON KEYWORD DETECTOR

(71) Applicant: SYNTIANT, Irvine, CA (US)

(72) Inventors: Kurt F. Busch, Laguna Hills, CA (US); Jeremiah H. Holleman, III, Davidson, NC (US); Pieter Vorenkamp, Laguna Beach, CA (US); Stephen W. Bailey, Irvine, CA (US)

(73) Assignee: SYNTIANT, Irvine, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/543,386

(22) Filed: Dec. 6, 2021

(65) Prior Publication Data
US 2022/0093085 A1 Mar. 24, 2022

Related U.S. Application Data

(63) Continuation of application No. 16/701,860, filed on Dec. 3, 2019, now Pat. No. 11,195,520, which is a
(Continued)

(51) Int. Cl.
*G10L 15/22* (2006.01)
*G06N 3/065* (2023.01)
(Continued)

(52) U.S. Cl.
CPC .............. *G10L 15/16* (2013.01); *G06N 3/065* (2023.01); *G06N 3/08* (2013.01); *G06N 3/105* (2013.01);
(Continued)

(58) Field of Classification Search
CPC ... G10L 2015/088; G10L 25/30; G10L 15/22; G10L 2015/223; G10L 25/78;
(Continued)

(56) References Cited

U.S. PATENT DOCUMENTS 8,401,297 B1 * 3/2013 Apostolos ............ G06V 10/811
382/181
10,157,629 B2 * 12/2018 van der Made ......... G06N 3/10
(Continued)

FOREIGN PATENT DOCUMENTS

CN 104809501 A 7/2015

OTHER PUBLICATIONS

Qiu et al. "A neuromorphic architecture for context aware text image recognition." In: Journal of 1-20 Signal Processing Systems. Nov. 2015 (Nov. 2015) Retrieved on Mar. 9, 2019 (Mar. 9, 2019) from <https://link.springer.com/article/10.1007%2Fs11265-015-1067-4>.

(Continued)

*Primary Examiner* — Vijay B Chawan
(74) *Attorney, Agent, or Firm* — Ravi Mohan; Rutan & Tucker, LLP

(57) ABSTRACT

Provided herein is an integrated circuit including, in some embodiments, a special-purpose host processor, a neuromorphic co-processor, and a communications interface between the host processor and the co-processor configured to transmit information therebetween. The special-purpose host processor is operable as a stand-alone host processor. The neuromorphic co-processor includes an artificial neural network. The co-processor is configured to enhance special-purpose processing of the host processor through the artificial neural network. In such embodiments, the host processor is a keyword identifier processor configured to transmit one or more detected words to the co-processor over the communications interface. The co-processor is configured to transmit recognized words, or other sounds, to the host processor.

20 Claims, 6 Drawing Sheets

Related U.S. Application Data continuation of application No. 16/235,396, filed on Dec. 28, 2018, now Pat. No. 10,504,507.

(60) Provisional application No. 62/611,512, filed on Dec. 28, 2017.

(51) Int. Cl.
| | | |
|---|---|---|
| *G06N 3/08* | (2023.01) | |
| *G06N 3/10* | (2006.01) | |
| *G06N 20/20* | (2019.01) | |
| *G10L 15/16* | (2006.01) | |
| *G10L 15/28* | (2013.01) | |
| *G10L 15/08* | (2006.01) | |

(52) U.S. Cl.
CPC .............. *G06N 20/20* (2019.01); *G10L 15/22* (2013.01); *G10L 15/28* (2013.01); *G10L 2015/088* (2013.01); *G10L 2015/223* (2013.01)

(58) Field of Classification Search
CPC ..... G10L 15/01; G10L 15/1822; G10L 15/26; G10L 15/28; G10L 15/285; G10L 15/32; G10L 17/24; G10L 2025/783; G10L 21/0208; G10L 21/0212; G10L 21/0316; G10L 21/10; G10L 25/63
See application file for complete search history.

(56) References Cited

U.S. PATENT DOCUMENTS

| | | | | |
|---|---|---|---|---|
| 10,162,378 | B1 * | 12/2018 | Rao | G06F 1/08 |
| 10,504,507 | B2 * | 12/2019 | Busch | G10L 15/22 |
| 10,614,798 | B2 * | 4/2020 | Seo | G10L 15/285 |
| 10,949,737 | B2 * | 3/2021 | Lee | G06N 3/049 |
| 11,195,520 | B2 * | 12/2021 | Busch | G06N 20/20 |
| 2011/0170560 | A1 | 7/2011 | Kyles et al. | |
| 2013/0073495 | A1 | 3/2013 | Izhikevich et al. | |
| 2015/0106085 | A1 * | 4/2015 | Lindahl | G10L 15/32 |
| | | | | 704/231 |
| 2015/0162002 | A1 * | 6/2015 | Liu | G10L 15/1822 |
| | | | | 704/235 |
| 2016/0179434 | A1 | 6/2016 | Herrero Abellanas et al. | |
| 2016/0260008 | A1 | 9/2016 | Arthur et al. | |
| 2016/0309267 | A1 | 10/2016 | Fitz et al. | |
| 2017/0185888 | A1 | 6/2017 | Chen et al. | |
| 2017/0229117 | A1 * | 8/2017 | van der Made | G06N 3/063 |
| 2017/0286827 | A1 * | 10/2017 | Chen | G06N 3/063 |
| 2017/0286829 | A1 | 10/2017 | Chen et al. | |
| 2017/0344885 | A1 * | 11/2017 | Hosokawa | G06N 3/063 |
| 2018/0122368 | A1 | 5/2018 | Costello et al. | |
| 2018/0174026 | A1 * | 6/2018 | Davies | G06N 3/063 |
| 2018/0349508 | A1 | 12/2018 | Bequet et al. | |
| 2019/0034791 | A1 * | 1/2019 | Busch | G06N 3/105 |
| 2019/0042920 | A1 | 2/2019 | Akin et al. | |
| 2019/0138892 | A1 | 5/2019 | Kim et al. | |
| 2019/0206391 | A1 | 7/2019 | Busch et al. | |

OTHER PUBLICATIONS

International Search Report and Written Opinion, PCT Application No. PCT/US2018/067899, dated Mar. 28, 2019.
Extended European Search Report, EP Application No. 18894060.5, mailed Aug. 13, 2021.
Darabkh, K. et al., "An efficient speech recognition system for arm-disabled students based on isolated words", Computer Applications in Engineering Education, vol. 26, No. 2, Nov. 7, 2017, pp. 285-301.
Tsai, W. et al., "Always-On Speech Recognition Using TrueNorth, a Reconfigurable, Neurosynaptic Processor", IEEE Transactions on Computers, IEEE, vol. 66, No. 6 Jun. 1, 2017, pp. 996-1007.

* cited by examiner

ALWAYS-ON KEYWORD DETECTOR

PRIORITY

This application claims the benefit of and is a continuation of U.S. patent application Ser. No. 16/701,680, filed Dec. 3, 2019, which is a continuation of U.S. patent application Ser. No. 16/235,396, filed Dec. 28, 2018, now U.S. Issued U.S. Pat. No. 10,504,507, which claims the benefit of priority to U.S. Provisional Patent Application No. 62/611,512, filed Dec. 28, 2017, which are hereby incorporated by reference into this application in their entireties.

FIELD

The field of the present disclosure generally relates to neuromorphic computing. More particularly, the field of the invention relates to an apparatus and a method for a low-power, always-on keyword detector.

BACKGROUND

Traditional central processing units ("CPUs") process instructions based on "clocked time." Specifically, CPUs operate such that information is transmitted at regular time intervals. Based on complementary metal-oxide-semiconductor ("CMOS") technology, silicon-based chips may be manufactured with more than 5 billion transistors per die with features as small as 10 nm. Advances in CMOS technology have been parlayed into advances in parallel computing, which is used ubiquitously in cell phones and personal computers containing multiple processors.

However, as machine learning is becoming commonplace for numerous applications including bioinformatics, computer vision, video games, marketing, medical diagnostics, online search engines, etc., traditional CPUs are often not able to supply a sufficient amount of processing capability while keeping power consumption low. In particular, machine learning is a subsection of computer science directed to software having the ability to learn from and make predictions on data. Furthermore, one branch of machine learning includes deep learning, which is directed at utilizing deep (multilayer) neural networks.

Currently, research is being done to develop direct hardware implementations of deep neural networks, which may include systems that attempt to simulate "silicon" neurons (e.g., "neuromorphic computing"). Neuromorphic chips (e.g., silicon computing chips designed for neuromorphic computing) operate by processing instructions in parallel (e.g., in contrast to traditional sequential computers) using bursts of electric current transmitted at non-uniform intervals. As a result, neuromorphic chips require far less power to process information, specifically, artificial intelligence ("AI") algorithms. To accomplish this, neuromorphic chips may contain as much as five times as many transistors as a traditional processor while consuming up to 2000 times less power. Thus, the development of neuromorphic chips is directed to provide a chip with vast processing capabilities that consumes far less power than conventional processors. Further, neuromorphic chips are designed to support dynamic learning in the context of complex and unstructured data.

There is an ongoing need for the development and enhancement of special-purpose processing capabilities such as that found in, for example, keyword detectors for hands-free operation of mobile devices. Provided herein are systems and methods for enhancing special-purpose processing capabilities for special-purpose processors operable as stand-alone processors utilizing a microcontroller interface.

SUMMARY

Disclosed herein is an integrated circuit for detecting keywords, comprising a keyword identifier host processor operable as a stand-alone host processor and configured to identify one or more words within a received audio stream, a neuromorphic co-processor including an artificial neural network that is configured to identify one or more desired keywords among the one or more words received from the host processor, and a communications interface between the host processor and the co-processor configured to transmit information therebetween.

In a further embodiment, the neuromorphic co-processor includes a database comprised of known keywords whereby the one or more desired keywords may be identified among the one or more words.

In another embodiment, new keywords may be added to the database and distinguished from existing keywords.

In a still further embodiment, the integrated circuit is configured to operate on battery power.

Further disclosed herein is a method for detecting keywords within an audio stream, comprising receiving the audio stream in the form of electrical signals to a keyword identifier host processor, transmitting the electrical signals from the host processor to a neuromorphic co-processor, identifying one or more desired keywords within the electrical signals, transmitting the one or more desired keywords from the neuromorphic co-processor to the host processor, and sending one or more output signals from the host processor upon receiving the one or more desired keywords from the neuromorphic co-processor.

In still another embodiment, the method further includes the neuromorphic co-processor including a database comprised of known keywords whereby the one or more desired keywords may be identified within the electrical signals.

In more embodiments, the method further includes the one or more keywords being comprised of predefined acoustic signal other than speech.

Still further disclosed herein is an integrated circuit, comprising a special-purpose host processor operable as a stand-alone host processor, a neuromorphic co-processor including an artificial neural network that is configured to enhance special-purpose processing of the host processor, and a communications interface between the host processor and the co-processor configured to transmit information therebetween.

In yet further embodiments, the host processor is a keyword identifier processor configured to transmit an audio stream in the form of electrical signals to the co-processor over the communications interface, and the co-processor is configured to enhance the special-purpose processing of the host processor by providing one or more detected keywords to the host processor over the communications interface.

In still yet further embodiments, the communications interface between the host processor and the co-processor is a serial peripheral interface ("SPI") bus or inter-integrated circuit ("I²C") bus.

In additional further embodiments, the artificial neural network is disposed in an analog multiplier array of a number of two-quadrant multipliers in a memory sector of the integrated circuit.

Yet additional embodiments include having synaptic weights of the artificial neural network are stored in firmware of the integrated circuit, and the firmware is configured for cloud-based upgrades to update the synaptic weights of the artificial neural network.

Additional further embodiments include having the integrated circuit is configured to operate on battery power.

Yet further disclosed herein is an integrated circuit for detecting keywords, comprising a special-purpose host processor configured to identify one or more sounds within a received audio stream and transmit the one or more sounds to a neuromorphic co-processor, an artificial neural network comprising the neuromorphic co-processor that is configured to identify one or more desired sounds among the one or more sounds received from the host processor, and a communications interface between the host processor and the co-processor configured to transmit information therebetween.

In still yet further embodiments, the integrated circuit is configured to remain in a low-power, always-on state whereby the integrated circuit remains continuously ready to receive the audio stream.

In a still yet additional embodiment, the host processor is configured to output one or more signal upon detection of the one or more desired sounds.

In additional embodiments, the integrated circuit is configured for implementation within a mobile device.

In more embodiments, the integrated circuit is configured to be powered by current leakage from a battery comprising the mobile device.

In a number of embodiments, the integrated circuit is configured to remain in a fully aware state whereby the integrated circuit remains continuously ready to receive the audio stream.

BRIEF DESCRIPTION OF THE DRAWINGS

The drawings refer to embodiments of the present disclosure in which.

Figure 1:
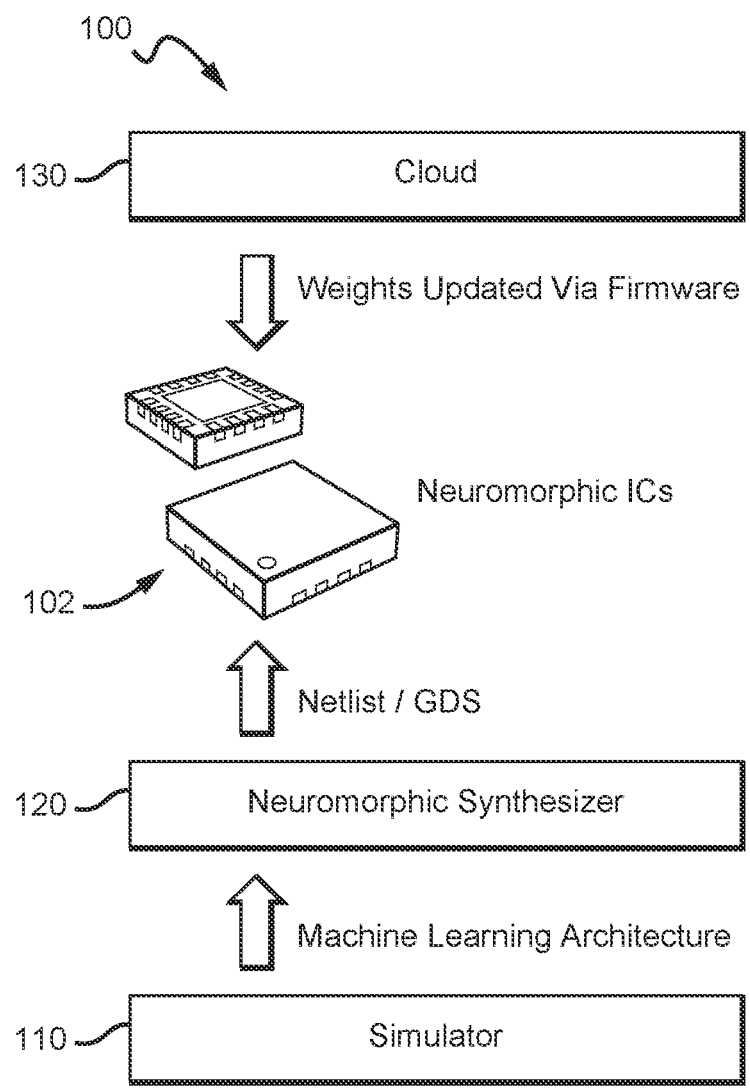
FIG. 1 provides a schematic illustrating an exemplary embodiment of a system for designing and updating neuromorphic integrated circuits ("ICs") in accordance with some embodiments.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DESCRIPTION

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" may include an instance of a computer program (e.g., a collection of instructions, also referred to herein as an application). In one embodiment, the process may be included of one or more threads executing concurrently (e.g., each thread may be executing the same or a different instruction concurrently).

The term "processing" may include executing a binary or script, or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed. Herein, the terms "binary file" and "binary" will be used interchangeably.

The term "file" is used in a broad sense to refer to a set or collection of data, information or other content used with a computer program. A file may be accessed, opened, stored, manipulated or otherwise processed as a single entity, object or unit. A file may contain other files, and may contain related or unrelated contents or no contents at all. A file may also have a logical format, and/or be part of a file system having a logical structure or organization of plural files. Files may have a name, sometimes called simply the "filename," and often appended properties or other metadata. There are many types of files, such as data files, text files, program files, and directory files. A file may be generated by a user of a computing device or generated by the computing device. Access and/or operations on a file may be mediated by one or more applications and/or the operating system of a computing device. A filesystem may organize the files of the computing device of a storage device. The filesystem may enable tracking of files and enable access of those files. A filesystem may also enable operations on a file. In some embodiments the operations on the file may include file creation, file modification, file opening, file reading, file writing, file closing, and file deletion.

The term "host processor" includes a primary processor such as a CPU or digital signal processor (DSP) of an IC in a system. The host processor is one that can stand alone but benefits from addition of neuromorphic computing provided by a neuromorphic IC or processor thereof through the microcontroller interface.

The term "co-processor" includes an additional processor interfaced with the host processor through a microcontroller interface. The additional processor can be configured to perform functions not possible with the host processor alone or functions the co-processor can perform faster or at lower power.

The term "enhancement filter" includes a filter configured to suppress undesired noise in a signal by selectively attenuating or boosting certain components of the signal on a time-varying basis. Likewise, "enhancement filtering" includes filtering to suppress undesired noise in a signal by selectively attenuating or boosting certain components of the signal on a time-varying basis.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Referring now to FIG. 1, a schematic illustrating a system 100 for designing and updating neuromorphic ICs is provided in accordance with some embodiments. As shown, the system 100 can include a simulator 110, a neuromorphic synthesizer 120, and a cloud 130 configured for designing and updating neuromorphic ICs such as neuromorphic IC 102. As further shown, designing and updating neuromorphic ICs can include creating a machine learning architecture with the simulator 110 based on a particular problem. As those skilled in the art can appreciate, cloud-based computer system may include, but are not limited to systems that can provide software as a service ("SaaS"), platform as a service ("PaaS"), and or infrastructure as a service ("IaaS") resources. The neuromorphic synthesizer 120 can subsequently transform the machine learning architecture into a netlist directed to the electronic components of the neuromorphic IC 102 and the nodes to which the electronic components are connected. In addition, the neuromorphic synthesizer 120 can transform the machine learning architecture into a graphic database system ("GDS") file detailing the IC layout for the neuromorphic IC 102. From the netlist and the GDS file for the neuromorphic IC 102, the neuromorphic IC 102, itself, can be fabricated in accordance with current IC fabrication technology. Once the neuromorphic IC 102 is fabricated, it can be deployed to work on the particular problem for which it was designed. While the initially fabricated neuromorphic IC 102 can include an initial firmware with custom synaptic weights between the nodes, the initial firmware can be updated as needed by the cloud 130 to adjust the weights. Being as the cloud 130 is configured to update the firmware of the neuromorphic IC 102, the cloud 130 is not needed for everyday use.

Neuromorphic ICs such as the neuromorphic IC 102 can be up to 100× or more energy efficient than graphics processing unit ("GPU") solutions and up to 280× or more energy efficient than digital CMOS solutions with accuracies meeting or exceeding comparable software solutions. This makes such neuromorphic ICs suitable for battery powered applications.

Neuromorphic ICs such as the neuromorphic IC 102 can be configured for application specific standard products ("ASSP") including, but not limited to, keyword detection, voice recognition, sound identification, one or more audio filters, gesture recognition, image recognition, video object classification and segmentation, or autonomous vehicles including drones. For example, if the particular problem is one of detecting keywords, the simulator 110 can create a machine learning architecture with respect to one or more aspects of spoken word identification. The neuromorphic synthesizer 120 can subsequently transform the machine learning architecture into a netlist and a GDS file corresponding to a neuromorphic IC for word identification, which can be fabricated in accordance with current IC fabrication technology. Once the neuromorphic IC for word identification is fabricated, it can be deployed to work on spotting instances of keywords in or with, for example, a mobile device as detailed further herein.

Neuromorphic ICs such as the neuromorphic IC 102 can be deployed in toys, sensors, wearables, augmented reality ("AR") systems or devices, virtual reality ("VR") systems or devices, mobile systems or devices, appliances, Internet-of-things ("IoT") devices, or hearing systems or devices.

Figure 2:
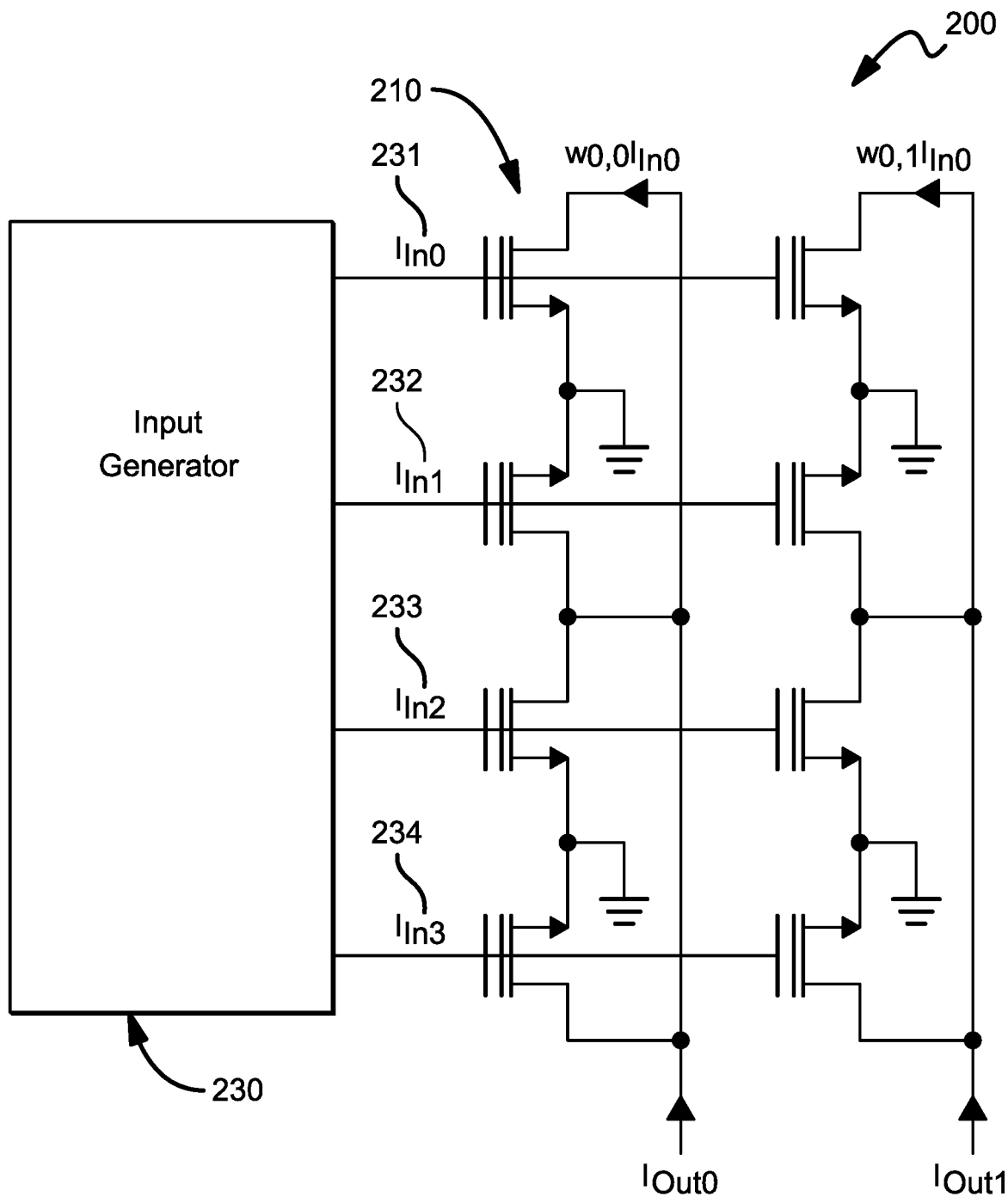
FIG. 2 provides a schematic illustrating an exemplary embodiment of an analog multiplier array in accordance with some embodiments.

Referring now to FIG. 2, a schematic illustrating an analog multiplier array 200 is provided in accordance with some embodiments. Such an analog multiplier array can be based on a digital NOR flash array in that a core of the analog multiplier array can be similar to a core of the digital NOR flash array or the same as a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neuromorphic ICs such as the neuromorphic IC 102. For example, a neural network can be disposed in the analog multiplier array 200 in a memory sector of a neuromorphic IC.

Since the analog multiplier array 200 is an analog circuit, input and output current values (or signal values) can vary in a continuous range instead of simply on or off. This is useful for storing weights, or coefficients, of a neural network as opposed to digital bits. In operation of certain embodiments, the weights are multiplied in a core by input current values 231, 232, 233, 234 to provide output current values that are combined to arrive at a decision of the neural network. Further, the analog multiplier array 200 can utilize standard programming and erase circuitry to generate tunneling and erase voltages. In many embodiments, the input current values 231, 232, 233, 234 are provided by an input generator 230. Those skilled in the art will recognize that such input current values can be generated or obtained from a variety of devices or other components within the system. Furthermore, stored charge within a multiplier 210 can shift voltage on the floating gate and scales drain current by weight $w_{i,j}$.

Figure 3:
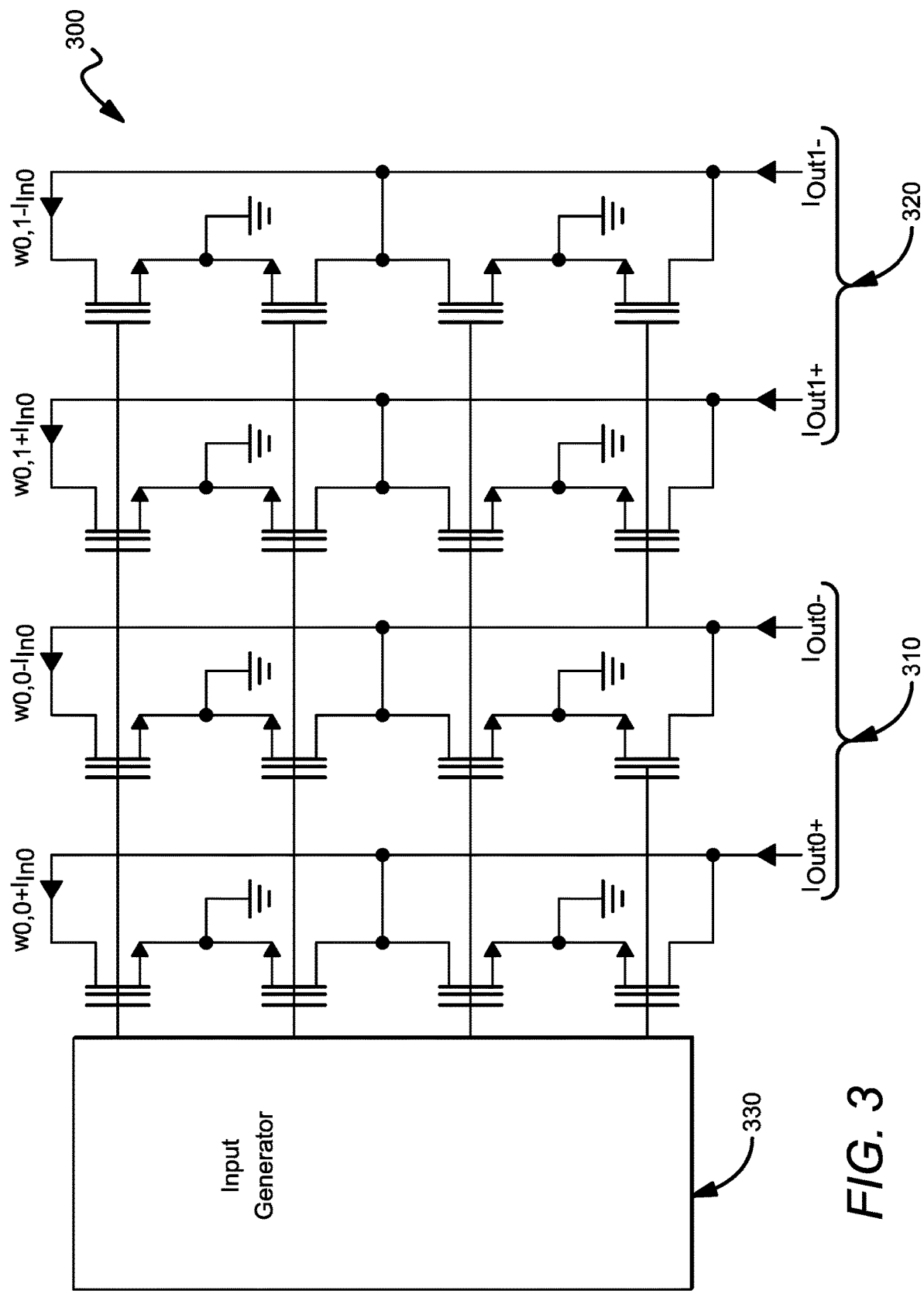
FIG. 3 provides a schematic illustrating an exemplary embodiment of an analog multiplier array in accordance with some embodiments.

Referring now to FIG. 3, a schematic illustrating an analog multiplier array 300 is provided in accordance with some embodiments. The analog multiplier array 300 can use two transistors (e.g., a positive transistor and a negative transistor) such as, but not limited to a metal-oxide semiconductor field effect transistor ("MOSFET") or field-effect transistor ("FET") to perform a two-quadrant multiplication of a signed weight (e.g., a positive weight or a negative weight) and a non-negative input current value. In many embodiments, the input current values can be provided by a separate input generator 330. The input generation of 330 can be similar to that of the input generator depicted in FIG. 2 in certain embodiments. If an input current value provided by the input generator 330 is multiplied by a positive or negative weight, the product or output current value can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). By way of example and not limitation, $I_{Out0+}$ and $I_{Out0-}$ can be taken as a differential current output 310 that then is provided to a plurality of current-sensing circuitry including, but not limited to, current mirrors, charge integrators, and/or transimpedance amplifiers. The foregoing differential outputs 310, 320 can provide positively and negatively weighted products or output signal values can be taken as a differential current value to provide useful information for making a decision.

Because each output current from the positive or negative transistor is wired to ground and proportional to the product of the input current value and the positive or negative weight, respectively, the power consumption of the positive or negative transistor is at or near zero when the input current values or weights are at or near zero. That is, if the input signal values are '0,' or if the weights are '0,' then no power will be consumed by the corresponding transistors of the analog multiplier array 300. This is significant because in many neural networks, often a large fraction of the values or the weights are '0,' especially after training. Therefore, energy is saved when there is nothing to do or going on. This is unlike differential pair-based multipliers, which consume a constant current (e.g., by means of a tail bias current) regardless of the input signal.

Figure 4:
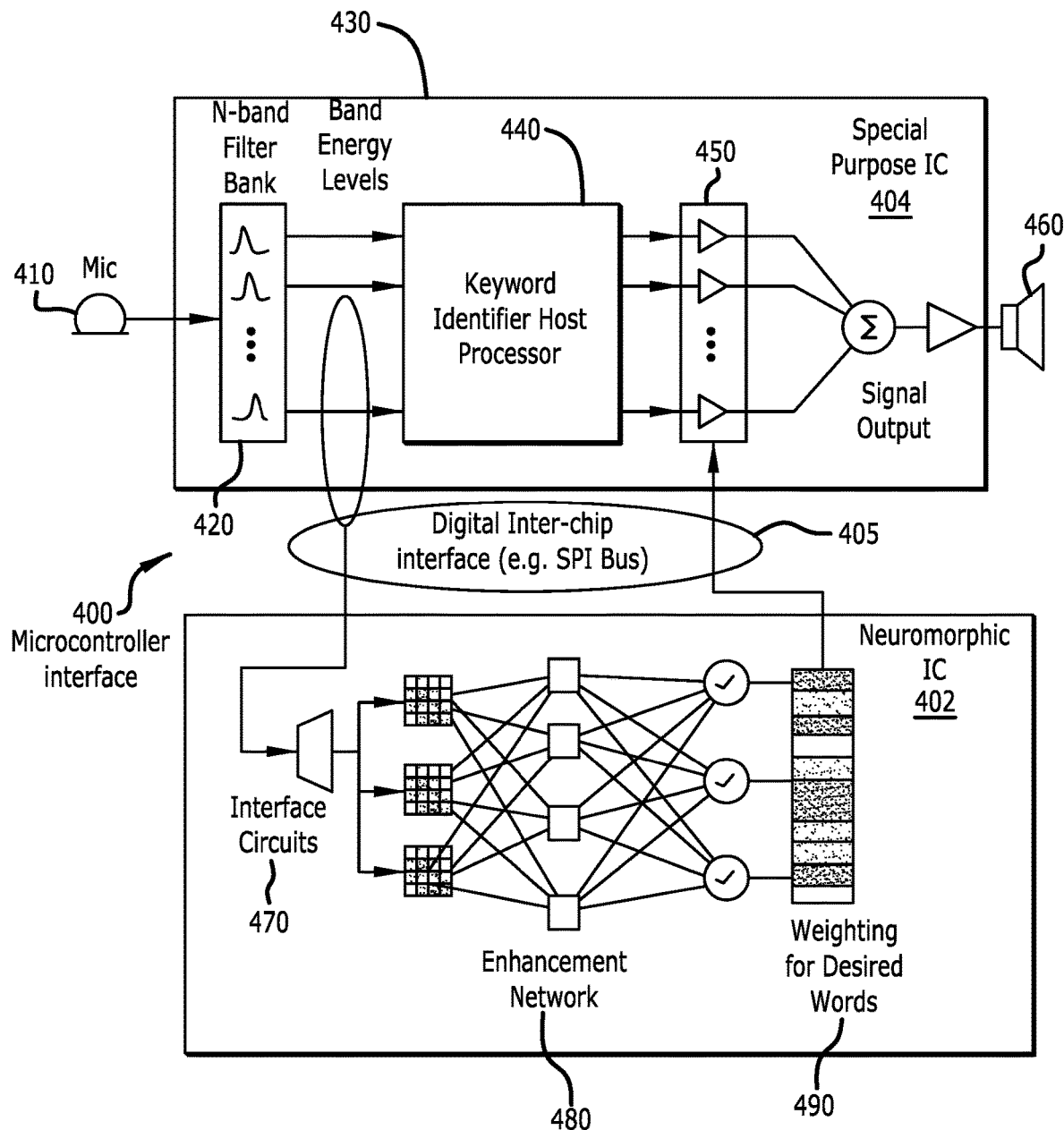
FIG. 4 provides a schematic illustrating an exemplary embodiment of a microcontroller interface between a co-processor of a neuromorphic IC and a host processor of a special-purpose IC in accordance with some embodiments.

Referring now to FIG. 4, a schematic is provided illustrating a microcontroller interface 400 between a co-processor of a neuromorphic IC 402 and a host processor of a special-purpose IC 404 in accordance with some embodiments. While the neuromorphic IC 402 and the special-purpose IC 404 are shown as two distinct ICs in FIG. 4, it should be understood that the foregoing ICs can alternatively be embodied in a single monolithic IC. As such, description regarding the microcontroller interface 400 between the co-processor of the neuromorphic IC 402 and the host processor of the special-purpose IC 404 should also be taken to describe the microcontroller interface 400 between a neuromorphic co-processor and special-purpose host processor of a single monolithic IC; that is, unless context clearly indicates otherwise.

As shown in FIG. 4, the special-purpose IC 404 can include, but is not limited to, an IC for speech recognition systems or devices including keyword spotters. An IC for a keyword spotter can include a keyword identifier host processor 440. as the special-purpose host processor, as well as microphone 410, a filter bank 420, filter bank output channels 430, post-processing word signal inputs 450, and a signal output 460. However, it should be understood that the neuromorphic co-processor can be interfaced with any one or more of a number of special-purpose host processors. The example embodiment of the neuromorphic co-processor interfaced with the keyword identifier host processor is merely provided for exposition. It should be understood that extension to other ASSPs might need certain modifications in line with the specific functions of the other ASSPs.

As further shown in FIG. 4, the neuromorphic IC 402 or a portion of the above-referenced single monolithic IC corresponding to the neuromorphic IC 402 may include, but is not limited to, interface circuits 470, a deep-speech enhancement network 480 with cloud-updateable synaptic weights, and a database of desired keywords 490. The neuromorphic IC 402 and the special-purpose IC 404 can be configured to communicate over a digital inter-chip interface 405 such as a serial peripheral interface ("SPI") bus or inter-integrated circuit ("I²C") bus. In a number of embodiments, the synaptic weights of the deep-speech enhancement network 480 can be updated either periodically or in response to a manual update process. In further embodiments, the synaptic weights may be modified dynamically based on feedback given by the user and/or system.

The keyword identifier host processor can be configured to transmit frequency elements or signal spectrum information in the form of Fourier transforms or similar frequency decompositions over the SPI bus to the neuromorphic co-processor for audio signal-processing tasks such as audio enhancement or de-noising. The neuromorphic co-processor can be configured to subsequently perform word recognition tasks and transmit results back over the SPI bus to the keyword identifier host processor. In some embodiments, the neuromorphic co-processor may have access to a database comprising a list of keywords whereby spoken keywords may be identified. In some embodiments, the results sent back to the keyword identifier host processor may include weighting signals for desired words that are detected. The keyword identifier host processor may be configured to subsequently transmit one or more signals indicating detection of a desired keyword. In some embodiments, the one or more signals may be comprised of signals that are sent to other special purpose ICs that are configured to perform specific tasks when desired keywords are detected.

It is contemplated that the special purpose IC 404 and neuromorphic IC 402 can be implemented in a single system or system on a chip ("SoC") configuration. It is also contemplated that certain embodiments may have either the special purpose IC 404 and/or the neuromorphic IC 402 implemented remotely with the digital interface 405 being through a network connection.

Figure 5:
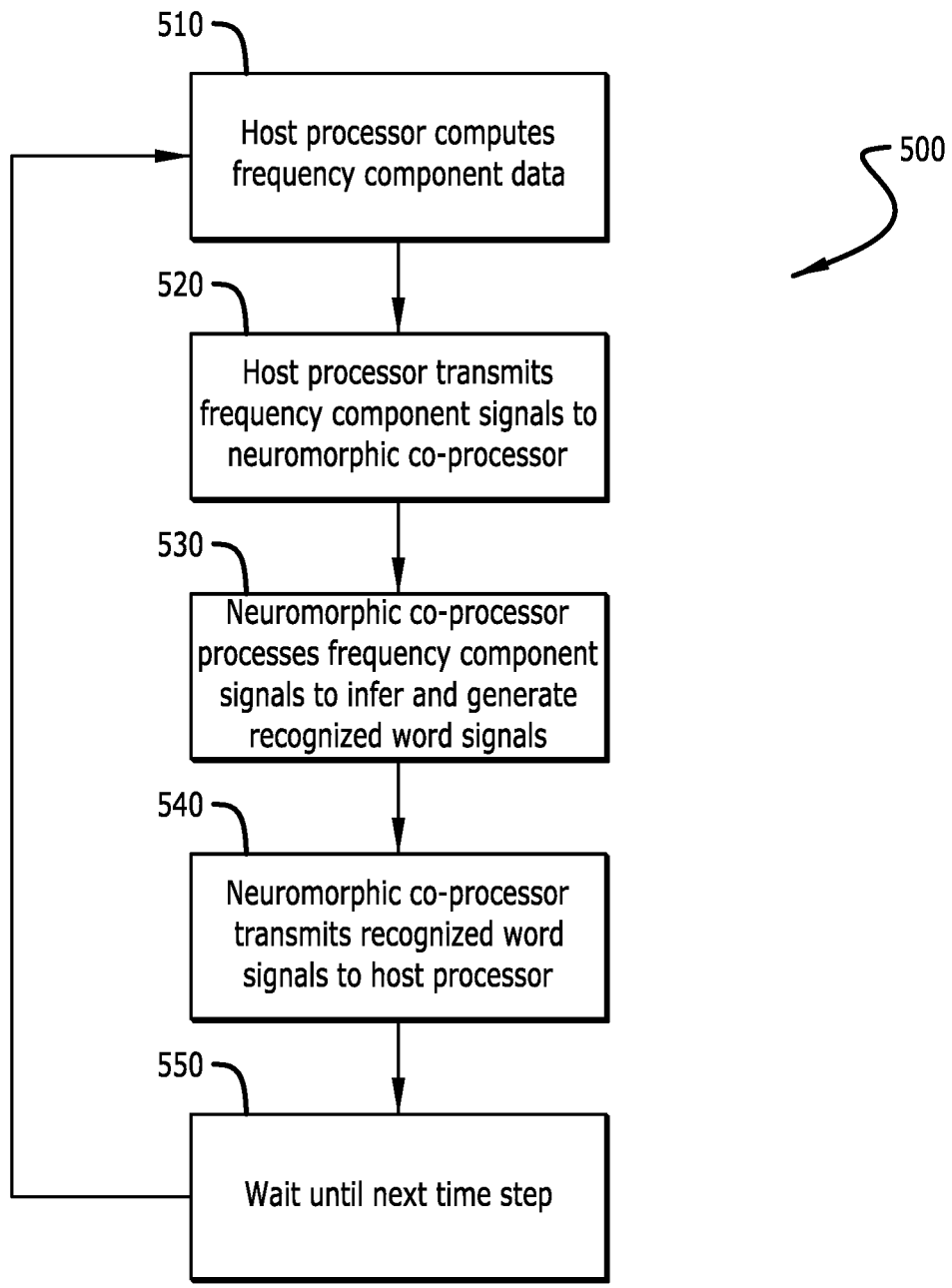
FIG. 5 provides a schematic illustrating an exemplary method of a neuromorphic IC for detecting spoken keywords in accordance with some embodiments.

Referring now to FIG. 5, a schematic is provided illustrating a method 500 of a neuromorphic IC for detecting spoken keywords, or other desired sounds, in accordance with certain embodiments. As shown, the method includes 1) a first step 510 where the keyword identifier host processor computes frequency component signals; 2) a second step 520 where the keyword identifier host processor transmits the frequency component signals to the neuromorphic co-processor; 3) a step 530 where the neuromorphic co-processor processes the signals to infer and identify desired keywords by generating recognized word signals from the frequency component signals; 4) a step 540 where the neuromorphic co-processor transmits the recognized keyword signals to the keyword identifier host processor; and 5) a step 550 where the neuromorphic co-processor waits until the next time step.

It should be understood that the method 500 is not to be limited to detecting speech, but rather the method 500 may be used to detect any type of desired sounds. For example, in some embodiments, the method 500 may be implemented in a security capacity. In such embodiments, the first step 510 may be comprised of the host processor identifying adverse sounds, such as an undesired intrusion into a restricted area. In step 530, the co-processor may perform sound recognition tasks, and then transmit recognized sounds to the host processor in step 540. Upon detecting an adverse sound, therefore, the host processor may output signals to other ICs that cause an alarm to sound.

Figure 6:
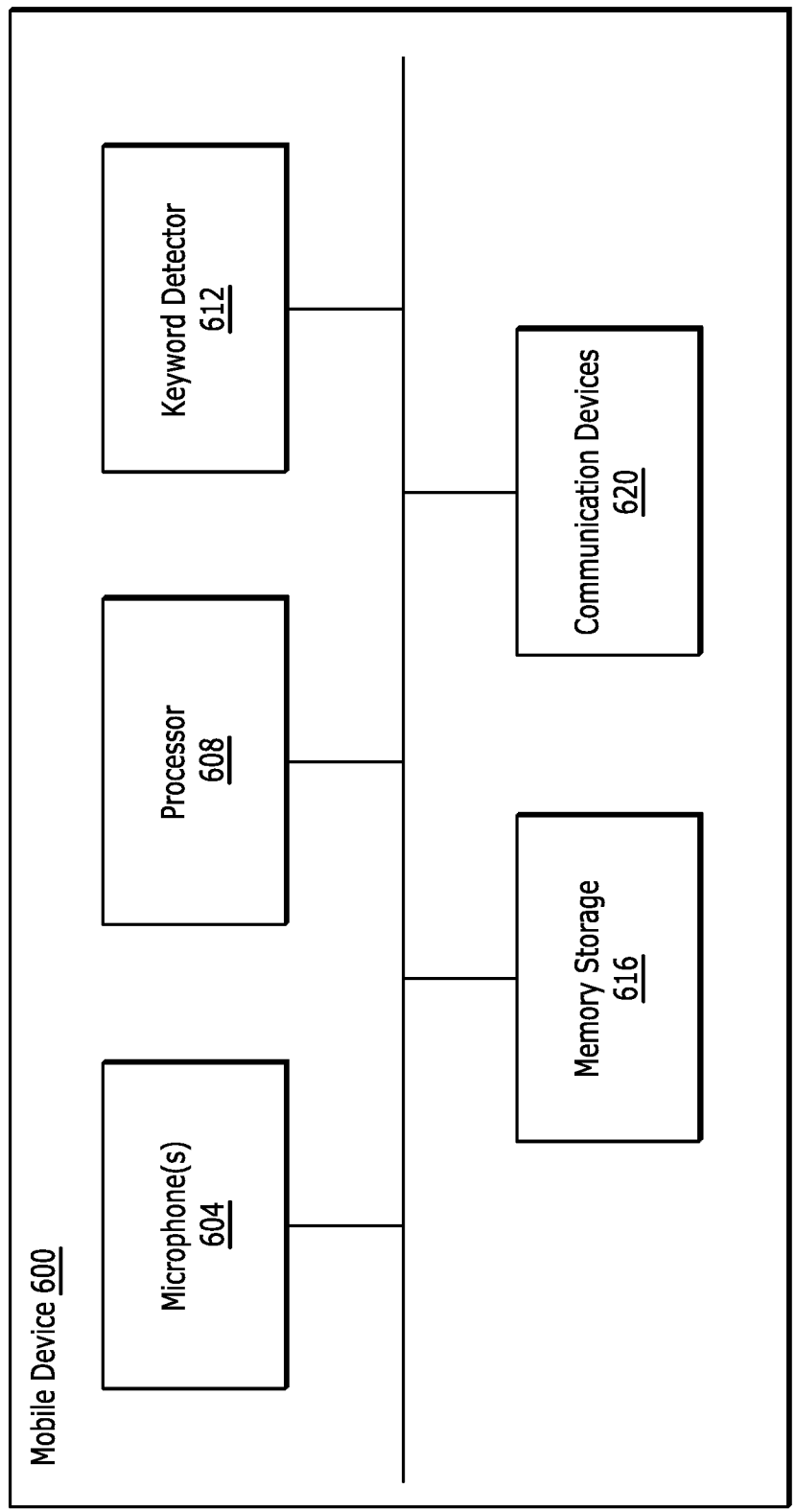
FIG. 6 provides a block diagram illustrating components comprising an exemplary mobile device that includes a keyword detector in accordance with some embodiments.

FIG. 6 is a block diagram illustrating components of an exemplary mobile device 600 that may include a keyword detector as disclosed in connection with FIG. 4. In the illustrated embodiment, the mobile device 600 includes one or more microphone(s) 604, at least one processor 608, a keyword detector 612, a memory storage 616, and one or more communication devices 620. In some embodiments, the mobile device 600 may also include additional or other components necessary for operation of the mobile device 600. In some embodiments, the mobile device 600 may include fewer components that perform similar or equivalent functions to those described herein.

In some embodiments, acoustic signals, once received, for example, as captured by the microphone(s) 604, may be converted into electric signals, which, in turn, may be converted, by the keyword detector 612, into digital signals for processing in accordance with some embodiments. The processed signals may be transmitted for further processing to the processor 608. In some embodiments, some of the microphones 604 may be digital microphone(s) operable to capture acoustic signals and output digital signals. Some of the digital microphone(s) may provide for voice activity detection, or vocalization detection, and buffering of the audio data significantly prior to the vocalization detection.

The keyword detector 612 may be operable to process an acoustic signal. In some embodiments, the acoustic signal is captured by the microphone(s) 604. In some embodiments, acoustic signals detected by the microphone(s) 604 may be used by the keyword detector 612 to separate desired speech (for example, keywords) from ambient noise, providing more robust automatic speech recognition ("ASR").

In some embodiments, the keyword detector 612 may be comprised of the neuromorphic IC 402 and the special purpose IC 404, discussed with reference to FIG. 4. The keyword detector 612 may be configured to transmit one or more signals indicating identification of desired keywords or other sounds. In some embodiments, the one or more signals may be sent to the processor 608 or other special purpose ICs that are configured to perform specific tasks when desired keywords or other sounds are identified. Thus, the keyword detector 612 may be configured to provide hands-free operation of the mobile device 600.

In some embodiments, the keyword detector 612 may be configured to remain in a low-power, always-on state whereby the keyword detector 612 remains continuously ready to detect keywords or other sounds. As will be recognized, conventional DSP keyword spotters generally reside in a less-aware, low-power state until something in the environment, such as speech, occurs and then the entire DSP is powered-on to full-power. With the entire DSP powered-on, the conventional DSP keyword spotter is then typically placed into a fully-aware state whereby keywords may be detected. In the case of word detection, however, the time required to switch the DSP from low-power to full-power leads to latency wherein the keyword spotter may miss the first one or more words. In some implementations, latency can lead to adverse results. For example, in the instance of a DSP detector that is configured for security, the time wasted due to latency may lead to a loss of crucial evidence regarding a crime that has been committed.

Unlike conventional DSP keyword spotters, the keyword detector 612 may be configured to remain fully aware when the mobile device 600 is placed into a low-power state. Through the use of the components described herein, the keyword detector 612 can be capable of detecting changes in the environment, such as speech, without taking time to power-on other components before detection may occur. Thus, the keyword detector 612 can be configured to detect keywords, or other sounds, with decreased and/or near-zero latency. It is contemplated that the fully aware state of the keyword detector 612 may be achieved by operating the keyword spotter within a power envelope that is insignificant to the rest of the components comprising the mobile device 600. In some embodiments, for example, the keyword detector 612 may be implemented as the smallest component comprising the mobile device 600, such that the keyword detector may be powered by current leakage from the battery. As such, when the components comprising the mobile device 600 are placed into a lower power, sleep mode, the keyword detector 612 may continue operating in a fully aware state that is sustained by typical leakage current from a battery.

The processor 608 may include hardware and/or software operable to execute computer programs and/or logics stored in the memory storage 616. The processor 608 may use floating point operations, complex operations, and other operations needed for implementations of embodiments of the present disclosure. In some embodiments, the processor 608 of the mobile device 600 may include, for example, at least one of a DSP, an image processor, an audio processor, a general-purpose processor, and the like.

The exemplary mobile device 600 may be operable, in various embodiments, to communicate over one or more wired or wireless communications networks, for example, via communication devices 620. In some embodiments, the mobile device 600 may send at least audio signals (speech) over a wired or wireless communications network. In some embodiments, the mobile device 600 may encapsulate and/or encode the at least one digital signal for transmission over a wireless network, such as a cellular network.

Moreover, it should be understood that the mobile device 600 in general, and the keyword detector 612 in particular, are not to be limited to detecting keywords for hands-free operation of the mobile device. For example, in some embodiments, the mobile device 600 may be configured for a security-related implementation. As such, the mobile device 600 may be configured to detect previously defined adverse sounds, such as glass breaking, within a restricted area. Upon detecting an adverse sound, the keyword detector 612 may be configured to output one or signals indicating to other components that the adverse sound has been detected. In some embodiments, for example, the keyword detector 612 may trigger an alarm system upon detecting an adverse sound.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An integrated circuit for detecting keywords or sound, comprising:
   a host processor configured to receive a data stream and compute frequency component signals for the data stream;
   a co-processor configured to identify one or more desired keywords or sound within the computed frequency component signals;
   wherein at least one of the host processor and co-processor is configured to remain in a low-power, always-on state that is continuously ready to detect the desired keyword or sound;
   the co-processor comprising an enhancement network with cloud-updateable synaptic weights; and
   an interface between the host processor and the co-processor configured to transmit information therebetween.

2. The integrated circuit of claim 1, wherein the co-processor is a neuromorphic processor.

3. The integrated circuit of claim 2, wherein the neuromorphic processor includes an artificial neural network.

4. The integrated circuit of claim 1, wherein the co-processor includes a database comprised of known keywords whereby the one or more desired keywords may be utilized by the co-processor.

5. The integrated circuit of claim 4, wherein additional keywords are added to the database.

6. The integrated circuit of claim 1, wherein the integrated circuit is configured to operate on current leakage from a power source.

7. A method for detecting keywords within a data stream, comprising:
   receiving, by a host processor, the data stream in the form of electrical signals;
   computing frequency component signals for the data stream;
   transmitting, to a co-processor, the computed frequency component signals;
   remaining in a low-power, always-on state that is continuously ready to detect one or more desired keywords;
   identifying the one or more desired keywords within the transmitted frequency component signals;
   providing an enhancement network with cloud-updateable synaptic weights; and
   transmitting, to the host processor, the one or more desired keywords.

8. The method of claim 7, wherein the co-processor includes a database of known keywords utilized to identify electrical signals corresponding to one or more keywords.

9. The method of claim 7, wherein the identifying one or more desired keywords is performed by an artificial neural network.

10. The method of claim 7, wherein the one or more keywords are comprised of a plurality of predefined acoustic signals other than speech.

11. An integrated circuit, comprising:
    a host processor;
    a co-processor including an artificial neural network configured to compute frequency component signals for an audio stream,
    wherein one or more desired keywords may be detected within the audio stream, the audio stream received in the form of electrical signals to the host processor,
    wherein the co-processor is configured to remain in a low-power, always-on state that is continuously ready to detect the one or more desired keywords;
    the co-processor comprising an enhancement network with cloud-updateable synaptic weights; and
    an interface between the host processor and the co-processor configured to transmit information therebetween.

12. The integrated circuit of claim 11, wherein the host processor is a pattern signal identifier processor configured to transmit the audio stream in the form of electrical signals to the co-processor over the interface, and wherein the co-processor is configured to enhance the processing of the host processor by providing one or more detected patterns within the pattern signal to the host processor over the interface.

13. The integrated circuit of claim 11, wherein the interface between the host processor and the co-processor is a serial peripheral interface ("SPI") bus or inter-integrated circuit ("I2C") bus.

14. The integrated circuit of claim 11, wherein the artificial neural network is disposed in an analog multiplier array of a number of two-quadrant multipliers in a memory sector of the integrated circuit.

15. The integrated circuit of claim 11, wherein synaptic weights of the artificial neural network are stored in firmware of the integrated circuit.

16. The integrated circuit of claim 15, wherein the firmware is configured to receive updates to the synaptic weights of the artificial neural network.

17. The integrated circuit of claim 11, wherein the integrated circuit is configured to operate on battery power.

18. The integrated circuit of claim 11, wherein the integrated circuit is configured to remain in a low-power, always-on state whereby the integrated circuit remains continuously ready to receive the audio stream.

19. The integrated circuit of claim 11, wherein the host processor is configured to generate an output signal upon detection of one or more desired keywords.

20. The integrated circuit of claim 11, wherein the integrated circuit is configured to remain in a fully aware state to receive the audio stream.

* * * * *